3,550,408
ELECTROMAGNETIC DOOR LOCKS OF AUTOMOTIVE VEHICLES
François Archaux and Pierre Bouthors, Billancourt, France, assignors to Regie Nationale des Usines Renault, Billancourt, France, and Automobiles Peugeot, Paris, France
Filed Mar. 13, 1969, Ser. No. 807,001
Claims priority, application France, Mar. 13, 1968, 143,567
Int. Cl. E05b 47/06, 65/36; H03k 17/74
U.S. Cl. 70—264          7 Claims

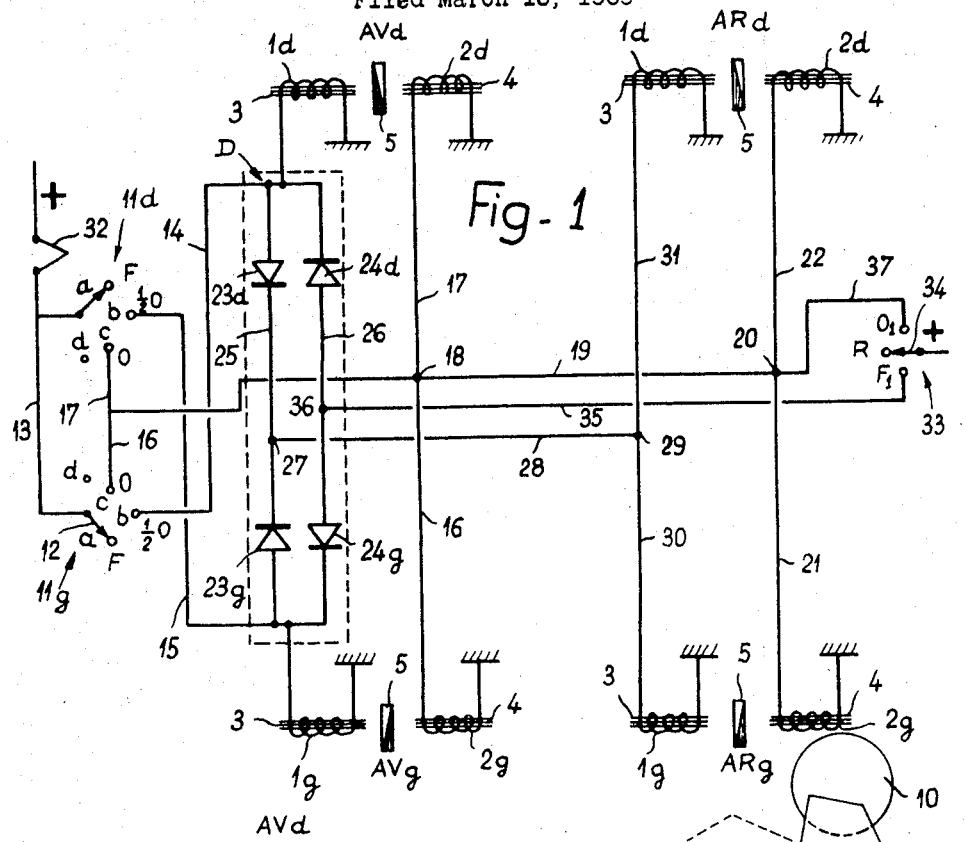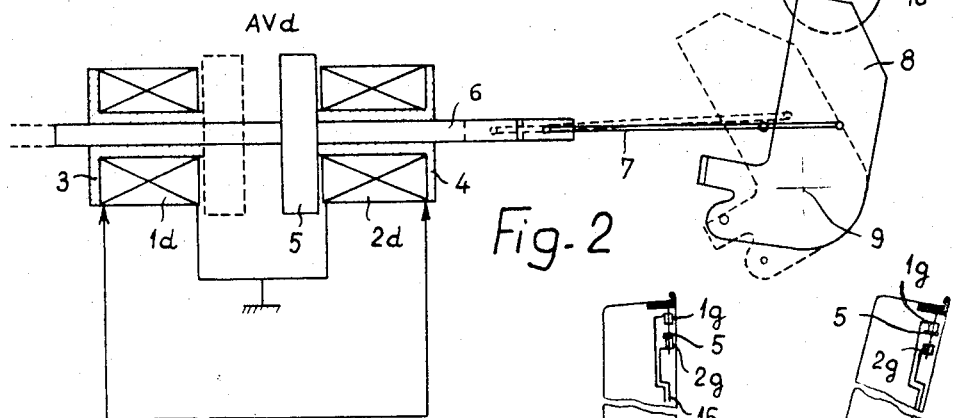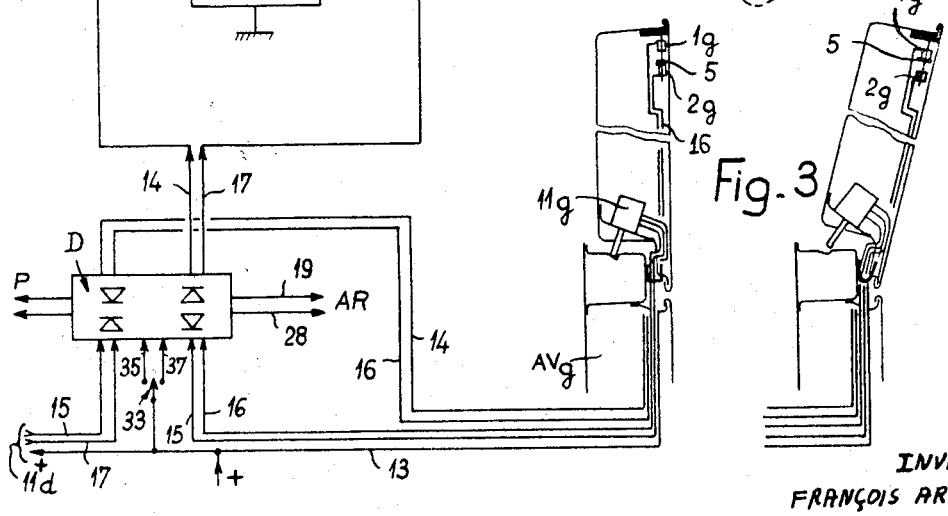

ABSTRACT OF THE DISCLOSURE

A remote-controlled electromagnetic locking device for automotive vehicles doors, wherein each door is equipped with a set of two coils having cores, and with a magnetized ferrite or a permanent magnet disposed between said coils and operatively connected to a pivoting member adapted to lock the door opening control member, this locking device being characterized in that each set of coils associated with a given door is connected to at least two central control means and that these central control means are adapted to control the energizing circuits of said coils in such a manner that the closing of a front door will cause all the other doors of the vehicles to be locked, said thus closed front door being compulsorily kept in its unlockable condition by unidirectional means inserted in said circuits.

---

The present invention relates to door locks of automobile vehicles and has specific reference to an electromagnetic device of which the essential feature resides in the fact that it can simultaneously and mutually lock or unlock all the doors of a vehicle by the closing and opening respectively of a single front door which remains unlocked.

Devices are already known which utilize to this end switch means mounted on the front door or in the vicinity of the lock barrels; it is also known to use electric coils adapted to push back a magnetized ferrite body connected to the lock and held in its endmost positions by a simple magnetization on the soft-iron cores of these coils and in a transient intermediate position by the simultaneous repulsion of said ferrite body by said two coils.

Devices of this last-mentioned type are objectionable in that they are difficult to carry out in practice for said intermediate position is seldom attained due to the relative magnitude of the frictional contacts in comparison with the forces implemented.

It is the essential object of the present invention to provide an electromagnetic device free of the inconvenience set forth hereinabove and adapted, under remote control conditions;

To unlock a set of doors by simply opening one of them;

To lock all the doors except the one which was closed last, thus permitting of obtaining the so-called "children safety" feature in conjunction with a positive protection against the untimely door opening maneuvers;

To eliminate any energy consumption in the endmost door-opening or door-closing positions.

This electromagnetic remote-controlled door locking device, wherein each door is provided with a set of two coils having soft-iron cores and a magnetized ferrite or a permanent magnet disposed between said coils and operatively connected to a pivoting member adapted to lock the door opening control member, is essentially characterized in that each set of coils associated with a given door is connected to at least two central control means, and that said central control means are adapted to control the energizing circuits of said coils in such a manner that the closing of a front door will cause all the other doors of the vehicle to be locked said thus closed front door being compulsory kept in its unlockable condition by unidirectional means inserted in said circuits.

According to another feature characterizing this invention the aforesaid central control members consist of a four position door jamb switch provided on each front door and responsive to the movement of the corresponding door, and possibly of an additional three position switch mounted on the instrument panel of the vehicle.

A clearer understanding of this invention will be had if reference is made to the accompanying drawing as the following description proceeds of a typical form of embodiment of invention which is given by way of example. In the drawing:

FIG. 1 is a wiring diagram of the device;

FIG. 2 is a diagrammatic comprehensive view of the device, with the doors closed, and FIG. 3 is a diagrammatic plan view from above of an open front door.

Referring to the drawing it will be seen that each front door (AV$g$, AV$d$) or each rear door (AR$g$, AR$d$) comprises an electromagnetic assembly consisting of two coils, namely a locking coil 1$d$ or 1$g$ and an unlocking coil 2$g$ or 2$d$ reinforced by soft-iron cores 3 and 4, respectively, and by a magnetized ferrite or a permanent magnet 5, respectively, movable between the two coils. This ferrite or magnet is rigid with a rod 6 of non-magnetic material which is adapted to slide through the cores 3 and 4 and connected by means of a link 7 to a pivoting member 8 adapted to revolve about the axis 9 of the door lock barrel. This pivoting member 8, according to its angular position, permits of locking or unlocking the push button 10 controlling the door lock.

In addition to the above-described electromagnetic assembly each front door AV$g$ and NV$d$ further comprises a four position door jamb switch 11$g$ or 11$d$ responsive to the door movements. The movable contact 12 of each switch 11 is connected via a conductor 13 to the positive terminal of the source of electric current having its negative terminal grounded. The endmost fixed contact studs $a$ and $d$ are not connected; thus, when the movable contact arm engages contact stud $a$ (which corresponds to the closed door position) or $d$ (which corresponds to the fully-open door position) no current is consumed by the device.

The first intermediate contact stud $b$ of switch 11$g$ of the left-hand front door AV$g$ is connected via a conductor 14 to one end of the coil 1$d$ of the right-hand front door AV$d$, the other end of each coil being grounded. Similarly, the contact stud $b$ of switch 11$d$ of the right-hand front door AV$d$ is connected via a conductor 15 to the coil 1$g$ of the left-hand front door AV$g$. Other conductors 16 and 17 connect the other intermediate fixed contact studs $c$ of switches 11$g$ and 11$d$ to the other coils 2$g$ and 2$d$ respectively of front doors AV$g$ and AV$d$, and are interconnected by a junction 18 connected in turn by a conductor 19 to another junction 20 to which are connected other conductors 21 and 22 leading to the coils 2$g$ and 2$d$ respectively of rear doors AR$g$ and AR$d$.

The coils 1$g$ and 1$d$ of the front doors AV$g$ and AV$d$ are also each connected to a pair of diodes 23$g$, 24$g$ (of which the first one is inversely mounted) and 23$d$, 24$d$ (of which the last one is inversely mounted). These diodes are assembled to constitute two parallel circuits, i.e. a first circuit 25 comprising the oppositely mounted diodes 23$g$ and 23$d$, and a second circuit 26 comprising the similarly oppositely mounted diodes 24$g$ and 24$d$. This diode circuit assembly is denoted "D" in FIGS. 1 and 2. The intermediate point 27 between diodes 23$g$ and 23$d$ is connected via a conductor 28 to a connector 29 to which are also connected the conductors 30 and 31 leading to coils 1$g$ and 1$d$ of rear doors AR$g$ and AR$d$ respectively.

In operation, when a front door, say door AV$g$, is open, the movable contact arm 12 of its door jamb switch 11$g$ engaging the fixed contact stud $c$ in position O, all the coils 2$g$ and 2$d$ of the four doors are energized, the current flowing through the circuits 13, 12, $c$, 16, 18, 17, 2$d$; 18, 16, 2$g$; 18, 19, 20, 21, 2$g$ and 20, 21, 22, 2$d$. The ferrites or magnets 5 are thus pushed against the cores 3 of coils 1$g$ and 1$d$, and remain in engagement therewith by magnetization. The rods 6 of said ferrites or magnets move the links 7 and their pivoting members 8 to the position shown in dash lines in FIG. 2; under these conditions the doors are unlocked, since the lock control push buttons 10 can operate the relevant doors freely.

When the same front door AV$g$ is closed, the movable contact arm 12 of switch 11$g$ firstly engages contact stud $b$ in the semi-closed or safety position ½O of door AV$g$. Thus, current flows through circuits 13, 12, $b$, 14, 1$d$; 14, 23$d$, 27, 28, 29, 30, 1$g$ and 29, 31, 1$d$. Both coils 1$g$ and 1$d$ of rear doors AR$g$ and AR$d$, and coil 1$d$ of the right-hand front door AV$d$ still closed are then energized and their ferrites or magnets 5 are moved back towards the cores 4 of coils 2, as shown in thick lines in FIG. 2. Thus, these three doors are locked since the pivoting members 8 lock the push buttons 10 controlling their locking mechanisms, respectively.

Only coil 1$g$ of left-hand front door AV$g$ still performing its closing movement remains de-energized, for the diodes 23$g$ and 24$d$, due to their reverse mounting, are extremely resistive to the passage of current towards the coil 1$g$. Therefore, this left-hand front door AV$g$ remains unlocked. Then, when it is closed completely, the movable contact arm 12 of switch 11$g$ being in position F, i.e. on contact stud $a$, all the coils are deenergized. The ferrites or magnets 5 remain in their position and the three doors are locked without causing any current consumption.

When a front door is opened the above-described sequence of operations takes place in the reverse order; thus, firstly, the doors are locked (in case they were not already locked) except the door being actuated, and then all the doors are unlocked.

With this device it is possible to lock and unlock other doors P in addition to the front and rear doors, for example the boot lid. This result can be achieved by simply equipping each additional door P with the same electromagnetic system and connecting its coils to the device, as shown in FIG. 2.

A thermal break switch 32 is inserted in the energizing circuit for preventing an unduly prolonged overheating of the coil windings in case current were allowed to flow through these windings by the intermediate contact studs of the door jamb switches when a front door remains half-open.

Furthermore, a control switch 33 mounted on the instrument panel of the vehicle may be provided. This reversing switch 33 comprises a movable contact arm 34 connected to the positive terminal of the source of current and three fixed contact studs, i.e. an inoperative stud R, a closing stud $F_1$ connected by a conductor 35 to the intermediate junction 36 between the diodes 24$d$ and 24$g$, and an opening stud $O_1$ connected by a conductor 37 to junctions 18 and 20, and to conductors 16 and 17, 21 and 22, of coils 2$g$ and 2$d$ of the rear doors AR$g$ and AR$d$, and of the front doors AV$d$ and AV$g$.

When the movable contact arm 34 is moved to position $F_1$ the coils 1$g$ and 1$d$ of the front and rear doors are energized, so that the four doors are locked; alternately, when the movable contact arm 34 is moved to position $O_1$, the coils 2$g$ and 2$d$ of the four doors are energized and these doors are thus unlocked.

Under these conditions it is clear that this switch 33 constitutes a third central control device, in addition to the two control devices provided by the front-door jamb switches.

An important feature characterizing the device of this invention is that it constitutes a reliable safety system against untimely door opening maneuvers while enabling the driver of the vehicle to effect the so-called "children safety" locking preventing children from opening a door when tampering with the lock control member.

The device according to this invention does not interfere whatsoever with the use of conventional locking means such as barrel locks and other known devices, thus protecting the device of this invention against a possible failure of the source of electric current.

What we claim is:

1. A remote-controlled electromagnetic locking device for automobile vehicle doors, wherein each door is equipped with a set of two coils having cores, and with a magnetized ferrite or a permanent magnet disposed between said coils and operatively connected to a pivoting member adapted to lock the door opening control member, this locking device being characterized in that each set of coils associated with a given door is connected to at least two central control means and that these central control means are adapted to control the energizing circuits of said coils in such a manner that the closing of a front door will cause all the other doors of the vehicles to be locked, said thus closed front door being compulsorily kept in its unlockable condition by unidirectional means inserted in said circuits.

2. Electromagnetic door locking device according to claim 1, characterized in that said central control means consist of door jamb switches associated with the front doors of the vehicle, each one of these switches comprising four positions of which the two endmost positions correspond to the closing and opening of the relevant door, the remaining two intermediate positions corresponding to the locking and unlocking of said door, respectively.

3. Electromagnetic door locking device according to claim 2, characterized in that the movable contact arm of each door jamb switch is connected to the source of electric current.

4. Electromagnetic door locking device according to claim 2, characterized in that the endmost fixed contact studs of said door jamb switches are not connected, and said intermediate fixed contact studs are connected, the one to the coils controlling the unlocking of all the other doors and the other to the coil controlling the locking of the other front door.

5. Electromagnetic door locking device according to claim 1, characterized in that the unlocking coils of the left-hand and right-hand front doors are each connected to a pair of diodes, one diode of each pair being inversely mounted with respect to the other diode, the diodes of both coils being inserted in two parallel circuits each comprising a pair of oppositely mounted diodes.

6. Electromagnetic door locking device according to claim 5, characterized in that the intermediate point of one of said parallel diode circuits is connected to the rear doors locking coils.

7. Electromagnetic door locking device according to claim 1, characterized in that a three position reversing switch connected to the source of current and to the locking and unlocking coils is mounted on the instrument panel of the vehicle and constitutes a third central control device permitting of remote-controlling the locking and unlocking of all the doors of the vehicle.

References Cited

UNITED STATES PATENTS

| | | | |
|---|---|---|---|
| 3,466,505 | 9/1969 | Anderson | 317—136 |
| 3,486,352 | 12/1969 | Bouthors et al. | 70—264 |

MARVIN A. CHAMPION, Primary Examiner

A. G. GRAIG, JR., Assistant Examiner

U.S. Cl. X.R.

307—10; 317—136